UNITED STATES PATENT OFFICE.

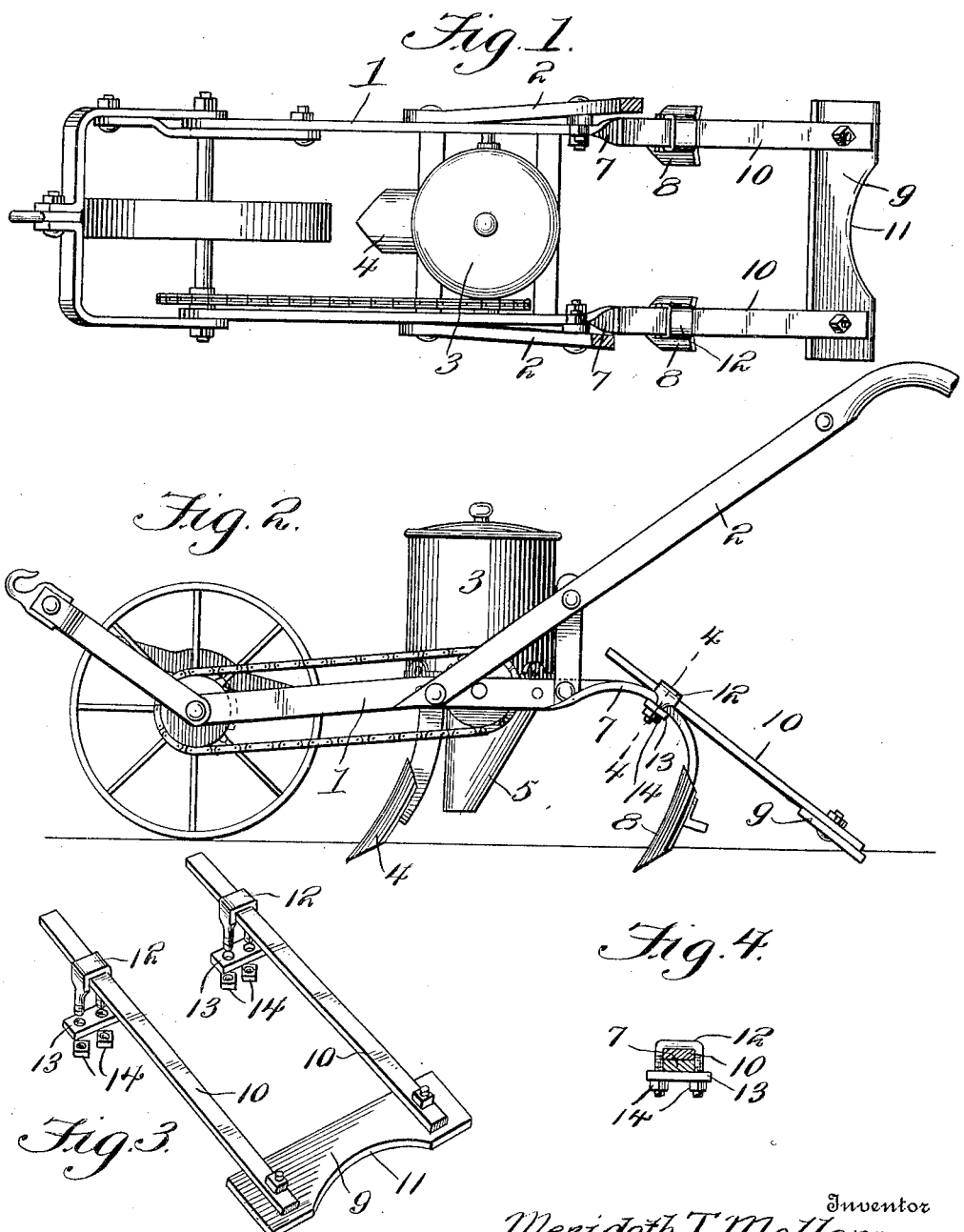

MERIDETH T. MALLORY, OF MINEOLA, TEXAS.

SEEDER AND PLANTER.

1,082,430.

Specification of Letters Patent.

Patented Dec. 23, 1913.

Application filed August 13, 1912. Serial No. 714,885.

*To all whom it may concern:*

Be it known that I, MERIDETH T. MALLORY, a citizen of the United States, residing at Mineola, in the county of Wood and State of Texas, have invented new and useful Improvements in Seeders and Planters, of which the following is a specification.

This invention relates to seeders and planters, and it has for its object to produce an improved leveling board to be used in connection therewith for the purpose of leveling the soil and crushing the clods and for the additional purpose of regulating the depth to which the seed shall be planted.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—Figure 1 is a top plan view of a planter equipped with the improved attachment. Fig. 2 is a side view of the same. Fig. 3 is a perspective view, showing the improved attachment removed from the planter. Fig. 4 is a sectional detail view taken on the line 4—4 in Fig. 2.

Corresponding parts in the several figures are denoted by like characters of reference.

The planter frame 1, which is provided with handles 2, whereby it may be guided, supports the seed hopper 3, a furrow opener 4 and a seed spout 5, whereby seed may be discharged into the furrow opened by the member 4. A supporting wheel has also been shown from which, in practice, motion is transmitted to the seed dropping mechanism. The side members of the frame 1 are curved downwardly at their rear ends to form standards 7 carrying the shovels or covering members 8 whereby dirt is thrown in the direction of the furrow to cover the seed.

The improved attachment comprises a board 9 which is bolted or otherwise secured on a pair of bars or straps 10 of steel or other suitable resilient material, said straps being positioned relatively near the ends of the board and in parallel relation to each other. The lower edge of the board 9 has a shallow arcuate recess 11. The bars or straps 10 are suitably spaced apart to engage the curved standards 7 upon which said straps are firmly secured by means of clamps 12 having clip plates 13 and nuts 14. When thus secured it will be noted that the straps 10 extend rearwardly of the standards 7 to support the board 9 in such position that it will drag on the ground in rear of the planter. It will also be noted that by moving the straps forwardly, the leveling board 9 will be raised, while by moving the straps rearwardly on the curved standards 7 the leveling board will be lowered with reference to the covering members 8. Again, by moving the clamps 12 along the arcuate standards 7, the position of the straps 10 may be varied to various inclinations between an approximately vertical and an approximately horizontal position, thus enabling the distance between the leveling board and the covering members to be varied, and enabling the most advantageous position for the work in hand to be obtained. It follows that by properly adjusting the leveling board the covering members as well as the furrow opening member 4 will be caused to engage the ground to a greater or lesser depth, thereby regulating the depth to which the seed will be deposited and covered. The board 9 also serves to level the soil and to crush or pulverize the clods, and the arcuate recess 11 at the lower edge of the leveling board will form a pronounced ridge along the line where the seed is deposited, thereby facilitating subsequent cultivation.

It is obvious that while the improved leveling device has been shown as attached to a planter, it may be efficiently used in connection with various agricultural implements embodying arcuate blade carrying standards.

Having thus described the invention, what is claimed as new, is:—

A frame having side members curved downwardly at their rear ends to form arcuate blade carrying standards, a leveling board, parallel supporting straps bolted on said leveling board and spaced apart a distance equal to that between the standards, and clamping means movable about the axes of the standards whereby the supporting straps are adjustably connected with said standards.

In testimony whereof I affix my signature in presence of two witnesses.

MERIDETH T. MALLORY.

Witnesses:
JNO. M. MOORE,
W. W. HOLLAND.